United States Patent
Shizuka et al.

[11] Patent Number: 6,159,637
[45] Date of Patent: Dec. 12, 2000

[54] LITHIUM SECONDARY CELL AND POSITIVE ELECTRODE MATERIAL THEREFOR

[75] Inventors: Kenji Shizuka; Kenji Okahara, both of Yokohama, Japan

[73] Assignee: Mitsubishi Chemical Corporation, Tokyo, Japan

[21] Appl. No.: 09/249,135

[22] Filed: Feb. 12, 1999

[30] Foreign Application Priority Data

Feb. 16, 1998 [JP] Japan ................... 10-032662

[51] Int. Cl.[7] .............. H01M 4/40; H01M 4/50
[52] U.S. Cl. .................. 429/224; 429/223; 429/218; 429/231.95
[58] Field of Search .................. 429/223, 224, 429/218, 231.95

[56] References Cited

U.S. PATENT DOCUMENTS

| | | | |
|---|---|---|---|
| 4,507,371 | 3/1985 | Thackeray | 429/191 |
| 4,980,251 | 12/1990 | Thackeray | 429/224 |
| 5,316,877 | 5/1994 | Thackeray | 429/197 |
| 5,518,842 | 5/1996 | Fey | 429/218 |
| 5,700,597 | 12/1997 | Zhong | 429/218 |
| 5,780,181 | 7/1998 | Idota | 429/194 |
| 5,858,324 | 1/1999 | Dahn | 423/596 |
| 5,866,279 | 2/1999 | Wada et al. . | |
| 5,900,385 | 5/1999 | Dahn | 502/302 |
| 5,965,293 | 10/1999 | Idota | 429/218.1 |
| 6,048,645 | 4/2000 | Saidi | 429/231.95 |

*Primary Examiner*—Maria Nuzzolillo
*Assistant Examiner*—Mark Ruthkosky
*Attorney, Agent, or Firm*—Oblon, Spivak, McClelland, Maier & Neustadt, P.C.

[57] ABSTRACT

A positive electrode material for a lithium secondary cell, which contains a spinel-type lithium manganese oxide having a crystal structure belonging to $Fd\bar{3}m$ (No. 227), wherein the lithium manganese oxide satisfies the following formula:

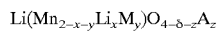

$$Li(Mn_{2-x-y}Li_xM_y)O_{4-\delta-z}A_z$$

wherein M is at least one metal element substitutable at Mn (16d) sites, other than Mn and Li, A is a halogen atom, x is from 0.01 to 0.10, y is a positive number, z is from 0 to 0.2, and δ represents a quantity of oxygen deficiency, and the average valency a of Mn is from 3.501 to 3.635.

17 Claims, 1 Drawing Sheet

FIG. 1

LITHIUM SECONDARY CELL AND POSITIVE ELECTRODE MATERIAL THEREFOR

BACKGROUND OF THE INVENTION

1. Field of the Invention

The present invention relates to improvements in a lithium secondary cell and a positive electrode material for a lithium secondary cell employing a spinel type lithium manganese oxide, particularly to improvements of the charge-discharge capacity, the cycle characteristics and the thermal stability of the cell.

2. Discussion of Background

As a positive electrode active material for a lithium secondary cell, $LiMn_2O_4$ has been proposed which is a compound oxide of manganese and lithium and which has a spinel structure, and various studies are being made thereon. This compound has a high voltage-high energy density and, in addition, has a merit that it is inexpensive, as the reserve of manganese as the starting material is larger than the reserve of cobalt or nickel when compared with a double oxide of cobalt and lithium or a double oxide of nickel and lithium. On the other hand, it has problems that the charge-discharge cycle life is short, and it is inferior in high temperature stability.

With respect to an improvement of the cycle characteristics of such a lithium manganese oxide at room temperature, it has been proposed to modify the lithium manganese oxide, for example, by increasing lithium excessively to obtain $Li_{1+x}Mn_{2-x}O_4$ as disclosed in JP-A-7-282798, or by substituting a part of manganese with other metals such as Co, Cr, etc., to obtain $LiMn_{2-x}Co_xO_4$ or $LiMn_{2-x}Cr_xO_4$, as disclosed in JP-A-3-108261 or JP-A-3-219571. However, such modification methods end up with a trade-off such that the initial charge-discharge capacity decreases in proportion to the substitution ratio. The reason is considered to be such that as a result of the substitution by a metal having a valency of at most 3, such as Li, Co or Cr, the average valency of Mn has increased on the principle of electrical neutrality, whereby the proportion of $Mn^{3+}$ ions contributing to the charge-discharge reaction has decreased.

Under these circumstances, JP-A-9-82362 proposes to substitute a part of Mn by a cation having an oxidation number lower than Mn thereby to limit the substitution ratio so as to limit the oxidation number in the initial state of the transition metal and to realize a high charge-discharge capacity and excellent cycle characteristics simultaneously.

On the other hand, with respect to improvement of the thermal stability, various studies have been made and reported for the purpose of improving cycle characteristics at a high temperature or improving the storage characteristics. For example, Journal of Power Sources, 74(1998) 228–233, discloses one having a part of Mn substituted by Co, and Electrochemical Society Proceedings, volume 97-18.494, discloses one having a part of Mn substituted by Co or one having a part of oxygen substituted by F, and results are shown which indicate that they have effects for improving high temperature cycle characteristics. However, such results are nothing more than the interrelation for the trade-off from the viewpoint of the balance with the initial charge-discharge capacity. Further, JP-A-8-264183 proposes to form a coating film of a metal fluoride on the surface of the active material, and JP-A-8-213014 proposes to improve the storage characteristics at a high temperature by carrying out surface modification by e.g. fluorination treatment of an active material. However, such attempts are likely to bring about a trouble in introduction or discharge of Li ions which takes place at the time of charging and discharging.

As described above, the methods for improvement so far proposed have not been able to get out of the trade-off relation such that if it is attempted to improve one of the initial charge-discharge capacity, the cycle characteristics and the thermal stability, the rest may deteriorate. In order to break through such a situation, it has been desired to develop a novel concept and a lithium manganese oxide improved by such a concept.

SUMMARY OF THE INVENTION

It is an object of the present invention to break through the trade-off relation among the initial charge-discharge capacity, the cycle characteristics and the thermal stability and thereby to provide an improved spinel-type lithium manganese oxide and a lithium secondary cell containing such an oxide as a positive electrode active material.

The present inventors have found it possible to solve the above problems by substituting for a part of Mn particular two kinds of elements and by strictly controlling elements substituted at Mn sites (16d) of the spinel-type lithium manganese oxide and the average valency of Mn at that time, and have accomplished the present invention.

In a first aspect, the present invention provides a positive electrode material for a lithium secondary cell, which contains a spinel-type lithium manganese oxide having a crystal structure belonging to Fd3m (No. 227), wherein the lithium manganese oxide satisfies the following formula:

wherein M is at least one metal element substitutable at Mn (16d) sites, other than Mn and Li, A is a halogen atom, x is from 0.01 to 0.10, y is a positive number, z is from 0 to 0.2, and δ represents a quantity of oxygen deficiency, and the average valency a of Mn is from 3.501 to 3.635.

Further, in a second aspect, the present invention provides a positive electrode material for a lithium secondary cell, which contains a spinel-type lithium manganese oxide having a crystal structure belonging to space group Fd3m (No. 227), wherein the lithium manganese oxide is such that some of 16d sites which are normally occupied by manganese atoms, are substituted by element M substitutable in a valency of at most 3 and element N substitutable in a valency of at least 4, and the average valency of manganese is at least 3.501.

DETAILED DESCRIPTION OF THE PREFERRED EMBODIMENTS

The lithium manganese oxide to be used in the present invention is a spinel type compound belonging to space group Fd3m (No. 227), and its composition is generally represented by $LiMn_2O_4$. In the present invention, the average valency of manganese means the value in an initial state before lithium is dedoped in a cell. In an actual composition, oxygen deficiency is likely to be present in many cases, and the substitution ratio of the element for substitution may be different from the charged composition in many cases. Accordingly, with respect to the average valency of manganese, it is important to use the value obtained by an actual analysis of the composition.

Now, the first aspect of the present invention will be described first.

The essential points of the first aspect of the present invention are such that:

1) the average valency of Mn is limited within a predetermined range by optimizing the balance between the quantity of oxygen deficiency and the substitution ratio of the metal element substituted at Mn sites (16d), and
2) as the element substituted at Mn sites (16d), not only Li but also other metal elements substitutable in a bivalent or trivalent state, are introduced.

With respect to the concept of 1), it is important to obtain the actual analytical value of the composition of the synthesized lithium manganate, as mentioned above, because even if it is attempted to mix and fire the materials to bring the atomic ratios to the predetermined ratios, the actual composition will not necessarily be within the prescribed ranges. The concept of 2) is such that the average valency of Mn is optimized by introducing an element having a higher valency, as the increase of the average valency of Mn is large when the Mn sites are substituted solely by Li.

In the present invention, x and y in the formula (1) and the average valency a of Mn for the positive electrode active material are defined to be $0.0 \leq x \leq 0.10$, $0 < y$, and $3.501 \leq a \leq 3.635$, respectively. These ranges represent the ranges in the initial state before lithium is dedoped from the positive electrode active material in a cell system. If they depart from the defined ranges, the desired cell performance tends to be hardly obtainable.

Here, the average valency a of Mn is from 3.501 to 3.635, and a is preferably at least 3.52, more preferably at least 3.54, and preferably at most 3.600, more preferably at most 3.59, most preferably at most 3.58. If it is too high, the charge-discharge capacity tends to be low, and if it is too low, deterioration of the cycle characteristics tends to be distinct.

x represents the amount of Li substituted at Mn (16d) sites, and it is from 0.010 to 0.10, preferably at least 0.015, more preferably at least 0.025, and preferably at most 0.08, more preferably at most 0.05, most preferably at most 0.04. If x is too small, the cycle characteristics tend to be inadequate, and if it is too large, deterioration of the charge-discharge capacity tends to be distinct.

The quantity of oxygen deficiency δ may be an optional number inclusive of 0 so long as the above x or a are within the above-mentioned ranges, but it is usually at least −0.025, preferably at least 0.001, more preferably at least 0.005, and usually at most 0.05, preferably at most 0.045, more preferably at most 0.04. If it is too large, the crystal structure tends to be instable, and if it is too small, it tends to be difficult to control the values x and y. The value of δ can be controlled by adjusting the firing atmosphere, the firing temperature and the cooling conditions at the time of producing the lithium manganese oxide, as described hereinafter.

The amount y of metal element M substituted at Mn (16d) sites may be at any level so long as it is larger than 0, but it is usually at least 0.01, preferably at least 0.05, more preferably at least 0.10. Further, y is usually at most 0.5, preferably at most 0.4, more preferably at most 0.3. However, more precisely, its upper limit is when a=3.635, and its range changes depending upon the values of δ, x, z and b (average valency of metal M). If y is too large, a problem may result due to a decrease in the charge-discharge capacity, and if it is too small, the effect for high temperature stability tends to be hardly obtainable.

Metal element M is preferably a bivalent or higher valent element. Metal element M may, for example, be Cr, Co, Fe, Ni, Cu, Zn, Ga, Al, B or Mg, preferably Cr, Co, Fe, Ga, Al or Mg, more preferably Co, Fe or Al. Further, as metal M, a plurality of such metals may be employed.

The valency b of metal element M can be determined, for example, by a method for determination by the chemical composition formula (Electrochemistry, 66,335 (1998)), a determination method by XPS (J. Electrochem. Soc., 143, 1607 (1996)), a determination method by EELS (J. Phys. Chem. Solids, vol. 57, No. 12, pp. 1851–1856, 1996), methods of using a powder X-ray Rietveld method and an X-ray absorption fine structure method (XAFS) (38th Electric Cell Meeting, 3A03, 151 (1997), or a method of using a bi-crystal type high resolution fluorescent X-ray analyzer (HRXRF) (39th Electric Cell Meeting, 2C16,277 (1998).

The halogen element A is not an essential component, but provides an effect such that by substituting the halogen element A for an oxygen atom, the substituted amount of substitutable metal M can further be increased. A may be F, Cl, Br or I, preferably F. A plurality of different types may be used as the halogen. The substituted amount z is usually at most 0.2, preferably at most 0.18, more preferably at most 0.15. Further, when the halogen element is employed, z is preferably at least 0.01, more preferably at least 0.05. If z is too large, it tends to be difficult to obtain the desired cell performance, and if it is too small, the effect of substitution tends to be hardly obtainable.

Now, the second aspect of the present invention will be described.

According to the study made by the present inventors, it is necessary to increase the proportion of Mn(III) in order to increase the charge-discharge capacity, which corresponds to lowering the average valency of Mn. However, in a valency region lower than the boarder line of 3.5 valency, the cycle characteristics tend to be remarkably low. Accordingly, in order to attain a high capacity without lowering the cycle characteristics, it is important that the proportion of Mn(IV) is larger than Mn(III).

With respect to the thermal stability, it is particularly important to see the stability in a charged state. For this purpose, it is necessary to reproduce and evaluate the state where lithium has been withdrawn from the lithium manganese oxide. The present inventors have subjected lithium manganese oxide to acid treatment to withdraw lithium and to obtain a λ-form $MnO_2$ having substantially the same composition as in a charged state and have investigated the thermal behavior by a differential scanning calorimetry (DSC measurement). It is known that when λ-form $MnO_2$ is subjected to DSC measurement, an exothermic reaction is observed by a phase transfer from λ-form to β-form in the vicinity of 280° C. Whereas, the present inventors have found that this phase transfer can be shifted to a level of not higher than 100° C. by the coexistence with acetylene black which is an electroconductive agent. This result indicates a factor for deterioration in a practical high temperature environment, and accordingly suggests at least that shifting of the phase transfer temperature to a high temperature side, is effective for improvement of the high temperature stability. Accordingly, in order to shift the phase transfer temperature to the high temperature side, studies have been made on various samples. As a result, it has been found that with λ-form samples having parts of Mn substituted by various other metal elements, the exothermic reaction temperatures due to the phase transfer, are shifted to the high temperature side in proportion to the substituted amounts, and the degrees of such shifts are not substantially different among various types of the substituted metals. This result indicates that so long as the substituted amount is the same, the degree of the shift of the phase transfer temperature is substantially the same irrespective of the valency of the element substituted. Accordingly, if substitution is carried out with a combination of an element substitutable in a valency of at most 3 and an element substitutable in a valency of at least 4, the average valency of Mn can be controlled within an optimum range even if the substituted amount is large, whereby it is possible to break through the conventional trade-off relation and to improve the capacity, the cycle characteristics and the high temperature stability.

From the above results, it is evident that by substituting some of sites which are occupied by manganese atoms of a lithium manganese oxide having a spinel-type structure by both of element M having a valency of at most 3 and element N having a valency of at least 4, and selecting the average valency of manganese, it is possible to simultaneously satisfy the three objects i.e. improvement of the charge-discharge capacity, improvement of the cycle characteristics and improvement of the high temperature stability without trade-off.

Namely, the second aspect of the present invention is characterized in that the concept of the first aspect of the present invention is further developed to obtain a positive electrode material having better characteristics.

The average valency of manganese in the second aspect of the present invention is at least 3.501. This average valency is usually at most 3.800, preferably at most 3.750, more preferably at most 3.635, still more preferably at most 3.6, but the most preferred range is at most 3.59, particularly at most 3.58. If the average valency of manganese is too large, the charge-discharge capacity tends to be low. Further, the average valency of manganese is preferably at least 3.515, more preferably at least 3.52, most preferably at least 3.535, particularly at least 3.54. If it is too small, the cycle characteristics tend to be poor.

The substitutable element M is not particularly limited so long as it is an element substitutable at Mn sites in a valency of at most 3. However, it may usually be a metal element such as Co, Fe, Cr, Ga, Al, Cu, Ni, Mg, Zn, B or Li, preferably Co, Fe, Cr, Al or Li. The substituted element N is also not particularly limited, so long as it is an element substitutable at Mn sites in a valency of at least 4. However, it may usually be a metal such as Ti, Sn, Ge, V, Nb, Ta or Sb, preferably Ti. Each of elements M and N may be composed of a plurality of different types of elements. Particularly, element M is preferably composed of lithium and other metal elements having a valency of at most 3.

The total of the substituted amounts of elements M and N is usually at least 5 atomic %, preferably at least 7.5 atomic %, more preferably at least 12.5 atomic %, based on Mn atoms, and it is usually at most 25 atomic %, preferably at most 20 atomic %, more preferably at most 17.5 atomic %. If the total substituted amount is small, the high temperature stability tends to be inadequate, and if it is too large, the charge-discharge capacity tends to be inadequate.

The respective amounts of elements M and N to be substituted, may suitably be set depending upon e.g. the above-mentioned total substituted amount, the average valency of manganese or the valences of substitutable elements. However, the amounts to be substituted are preferably such that the ratio of the substituted amount (atomic %) of element M to the substituted amount (atomic %) of element N will be usually within a range of from 1:99 to 99:1, preferably from 10:90 to 90:10.

Further, in the second aspect of the present invention, a still larger effect can be obtained by providing oxygen deficiency. The reason is such that in addition to elements M and N substitutable at Mn sites, the oxygen deficiency δ will also be an element for controlling the average valency of Mn, whereby the degree of freedom to bring the average valency of Mn into the prescribed range, will increase, and it will be possible to suppress the decrease of the capacity even when the substituted amounts of substitutable elements M and N are further increased. The range of the quantity of oxygen deficiency is not particularly limited so long as a single phase can be maintained, but it is usually at least −0.025, preferably at least 0.001, more preferably at least 0.005, and usually at most 0.05, preferably at most 0.05, preferably at most 0.045, more preferably at most 0.04. If it is too large, the crystal structure tends to be instable, and if it is too small, the substituted amounts of elements M and N tend to be hardly controlled. The value of δ can be controlled by adjusting the firing atmosphere, the firing temperature and the cooling condition at the time of producing the lithium manganese oxide, as described hereinafter. The quantity of oxygen deficiency δ corresponds to the value of δ in a case where the lithium manganese oxide is represented by $LiMn_2O_{4-\delta}$.

Some of sites occupied by oxygen atoms may be substituted by halogen atoms. The halogen element is not an essential component, but provides an effect such that by substituting oxygen atoms by halogen element A, the substituted amounts of substitutable metals M and N can further be increased. The halogen may be F, Cl, Br or I, preferably F. As the halogen, a plurality of different types may be employed. The substituted amount z is usually at most 0.2, preferably at most 0.18, more preferably at most 0.15. Further, when the halogen element is employed, z is preferably at least 0.01, more preferably at least 0.05. If z is too large, it tends to be difficult to obtain the desired cell performance, and if it is too small, the effect of substitution tends to be hardly obtainable. Here, the substituted amount z of the halogen element corresponds to the value of z when the lithium manganese oxide is represented by $LiMn_2O_{4-z}A_z$ (wherein A is a halogen).

The lithium manganese oxide of the present invention can be produced by mixing and firing a lithium compound, a manganese compound and a compound containing an element which is substituted at manganese sites, as the starting materials.

As the lithium compound which can be used as the starting material, $Li_2CO_3$, $LiNO_3$, LiOH, $LiOH.H_2O$, LiCl, $CH_3COOLi$, $Li_2O$, a Li dicarboxylate or a Li fatty acid salt, may, for example, be mentioned. Among them, it is preferred to employ $LiOH.H_2O$ and LiOH.

As the manganese compound which can be used as the starting material, a manganese oxide such as $Mn_2O_3$ or $MnO_2$, or a manganese salt such as $MnCO_3$, $Mn(NO_3)_2$, a manganese dicarboxylate or a manganese fatty acid salt, may, for example, be mentioned. Among them, it is preferred to employ $Mn_2O_3$. In such a case, $Mn_2O_3$ may be one prepared by heat treating a compound such as $MnCO_3$ or $MnO_2$.

As the compound containing a substitutable element, an oxide, a nitrate, a carbonate, a dicarboxylate or a fatty acid salt of such an element, may, for example, be mentioned.

Further, when a halogen element is to be introduced, a halide of lithium or manganese, such as LiF, $MnF_2$ or $MnF_3$ may be used. A halide of substitutable element M or N may also be used.

The lithium manganese oxide of the present invention can be obtained by mixing the above-described starting materials in a predetermined ratio by dry mixing, wet mixing or other method, followed by firing in the presence of oxygen, and cooling the fired product.

The lithium manganese oxide of the present invention can relatively easily be obtained by preparing it under the reaction conditions disclosed in e.g. JP-A-9-306490, JP-A-9-306493 or JP-A-9-259880. As an example for a specific method for the production, there may be mentioned a method wherein a mixture of the starting materials is calcined and then fired in an oxygen atmosphere at a temperature of from 600° C. to 850° C., followed by annealing to a temperature of at most 500° C. at a rate of at most 10° C./min, or a method wherein after the calcination, the firing is carried out in air or an oxygen atmosphere at a temperature of from 600° C. to 850° C., followed by annealing in an oxygen atmosphere at 400° C. As mentioned above, the quantity of oxygen deficiency can be changed by adjusting the firing atmosphere, the firing temperature or the cooling conditions at that time. For example, if the cooling is carried out rapidly, oxygen deficiency is likely to form. The oxide of the present invention is by no means restricted to those produced by the above-mentioned methods.

The lithium manganese oxide of the present invention will be used as a positive electrode material (a positive electrode active material) for a lithium secondary cell. In such a case, it is preferred that such a positive electrode consists essentially of a single phase of the above-mentioned lithium manganese oxide.

The negative electrode active material to be used for the lithium secondary cell of the present invention may be any material which is commonly used for a lithium secondary cell of this type. For example, it may be lithium or a lithium alloy, but a carbon material is preferred which is more safe and capable of taking in and discharging lithium. Such a carbon material is not particularly limited, and it may, for example, be graphite, coal-base coke, petroleum-base coke, carbide of coal-base pitch, carbide of petroleum-base pitch, needle coke, pitch coke or a carbide of e.g. a phenol resin or crystal cellulose, or a carbon material obtained by partially graphitizing such a carbide, furnace black, acetylene black or pitch-base carbon fibers.

Both the positive electrode and the negative electrode can be obtained by slurring the respective active materials and a binder by means of a solvent and coating and drying the slurry.

The binder for the negative and positive electrode active materials, may, for example, be polyvinylidene fluoride, polytetrafluoroethylene, EPDM (ethylene/propylene/diene three component copolymer), SBR (styrene/butadiene rubber), NBR (acrylonitrile/butadiene rubber) or fluorine rubber. However, the binder is not limited to such examples.

As the solvent for slurring to be used for the preparation of the positive electrode or the negative electrode, an organic solvent capable of dissolving the binder is usually employed. For example, N-methylpyrrolidone, dimethylformamide, dimethylacetamide, methyl ethyl ketone, cyclohexanone, methyl acetate, methyl acrylate, diethyltriamine, N,N-dimethylaminopropylamine, ethylene oxide or tetrahydrofuran, may be mentioned. Otherwise, the active material can be slurried with a latex such as SBR by adding e.g. a dispersant or a thickener to water.

The positive electrode may contain an electroconductive agent. As such an electroconductive agent, fine particles of graphite, carbon black such as acetylene black, or fine particles of amorphous carbon such as needle coke, may, for example, be used. However, the conductive agent is not limited to such examples.

The positive electrode or the negative electrode may have a current collector formed thereon. The current collector for a negative electrode may, for example, be copper, nickel, stainless steel or nickel-plated steel. The current collector for a positive electrode may, for example, be aluminum, stainless steel or nickel-plated steel.

A separator may be provided between the positive electrode and the negative electrode. As a useful separator, a fine porous polymer film may be employed, such as one made of nylon, cellulose acetate, nitrocellulose, polysulfone, polyacrylonitrile, polyvinylidene fluoride or a polyolefin such as polypropylene, polyethylene or polybutene. The chemical and electrochemical stability of the separator is important. From this viewpoint, a polyolefin type polymer is preferred, and from the viewpoint of the self-closing temperature as one of the objects of a cell separator, one made of polyethylene is preferred. In the case of a polyethylene separator, an ultra high molecular weight polyethylene is preferred from the viewpoint of a high temperature shape-maintaining property, and the lower limit of the molecular weight is preferably 500,000, more preferably 1,000,000, most preferably 1,500,000. On the other hand, the upper limit for the molecular weight is preferably 5,000,000, more preferably 4,000,000, most preferably 3,000,000. If the molecular weight is too large, the fluidity tends to be too low, whereby perforations of the separator may not sometimes be closed even when heated.

For an ion conductor in the lithium secondary cell of the present invention, a known organic electrolyte, a polymer solid electrolyte, a gel electrolyte or an inorganic solid electrolyte may, for example, be used. However, an organic electrolyte or a gel electrolyte is preferred, and particularly preferred is an organic electrolyte (non-aqueous electrolyte). The organic electrolyte is usually composed of an organic solvent and a solute.

The organic solvent to be used for the non-aqueous electrolyte is not particularly limited, and it may, for example, be a carbonate, an ether, a ketone, a sulfolane type compound, a lactone, a nitrile, a chlorinated hydrocarbon, an ether, an amine, an ester, an amide or a phosphoric acid ester compound. As typical examples, propylene carbonate, ethylene carbonate, vinylene carbonate, tetrahydrofuran, 2-methyltetrahydrofuran, 1,4-dioxane, 4-methyl-2-pentanone, 1,2-dimethoxyethane, 1,2-diethoxyethane, γ-butyrolactone, 1,3-dioxolan, 4-methyl-1,3-dioxolan, diethyl ether, sulfolane, methylsulfolane, acetonitrile, propionitrile, benzonitrile, butyronitrile, valeronitrile, 1,2-dichloroethane, dimethylformamide, dimethylsulfoxide, trimethyl phosphate and triethyl phosphate may be used alone or as a solvent mixture of two or more of them.

The solute to be dissolved in such a solvent is not particularly limited, and any conventional solute may be employed. For example, a lithium salt such as $LiClO_4$, $LiAsF_6$, $LiPF_6$, $LiBF_4$, $LiB(C_6H_5)_4$, LiCl, LiBr, $CH_3SO_3Li$ or $CF_3SO_3Li$, may be mentioned, and at least one of these may be employed.

When a polymer solid electrolyte is used as an ion conductor, a known polymer may be employed, and it is particularly preferred to employ a polymer having a high ion conductivity for lithium ions. For example, polyethylene oxide, polypropylene oxide or polyethylene imine may preferably be used. Further, it is also possible to add the above-mentioned solvent to this polymer together with the above-mentioned solute to obtain a gel electrolyte.

When an inorganic solid electrolyte is used as an ion conductor, a known crystalline or non-crystalline solid electrolyte may be used as such an inorganic substance. The crystalline solid electrolyte may, for example, be LiI, Li$_3$N, Li$_{1+x}$M$_x$Ti$_{2-x}$(PO$_4$)$_3$ (M=Al, Sc, Y or La), Li$_{0.5-3x}$RE$_{0.5+x}$TiO$_3$ (RE=La, Pr, Nd or Sm), and the non-crystalline solid electrolyte may, for example, be an oxide glass such as 4.9LiI-34.1Li$_2$O-61B$_2$O$_5$ or 33.3Li$_2$O-66.7SiO$_2$, or a sulfide glass such as 0.45LiI-0.37Li$_2$S-0.26B$_2$S$_3$ or 0.30LiI-0.42Li$_2$S-0.28SiS$_2$. At least one member among these may be employed.

Now, the present invention will be described in further detail with reference to Examples. However, it should be understood that the present invention is by no means restricted by such specific Examples.

1. Examples relating to the first aspect of the present invention

EXAMPLE 1

Using LiOH.H$_2$O, Mn$_2$O$_3$ and Co$_3$O$_4$ as starting materials, they were blended so that the molar ratio of the respective compounds would be 1.00:0.94:0.04. To this blend, ethanol was added, followed by grinding well in a mortar to obtain a uniform mixture. The obtained mixture was calcined in the atmospheric air at 500° C. for 24 hours and then further mixed in a dry system. Then, it was fired in the atmospheric air at 800° C. for 24 hours and then annealed to 450° C. at a rate of 1° C./min. It was further maintained at 450° C. for 6 hours and then cooled to room temperature at a rate of 5° C./min.

EXAMPLE 2

Using Li$_2$CO$_3$, Mn$_2$O$_3$ and Co$_3$O$_4$ as starting materials, they were blended so that the Li/(Mn+Co) molar ratio would be 1.04/2, and the Co/Mn molar ratio would be 0.12/1.88. To this blend, ethanol was added, followed by mixing in a ball mill to obtain a uniform mixture. The obtained mixture was calcined in the atmospheric air at 500° C., 600° C., 700° C. and 800° C. for 6 hours each by stepwisely raising the temperature (5° C./min) and further mixed in a dry system. Then, it was fired in the atmospheric air at 850° C. for 24 hours and then annealed to 300° C. at a rate of 0.2° C./min.

EXAMPLE 3

Using Li$_2$CO$_3$, Mn$_2$O$_3$ and MgO as starting materials, they were blended so that the Li/(Mn+Mg) molar ratio would be 1.04/2, and the Mg/Mn molar ratio would be 0.05/1.95. To this blend, ethanol was added, followed by mixing in a ball mill to obtain a uniform mixture. The obtained mixture was calcined in the atmospheric air at 500° C., 600° C., 700° C. and 800° C. for 6 hours each by stepwisely raising the temperature (5° C./min) and further mixed in a dry system. Then, it was fired in the atmospheric air at 850° C. for 24 hours and then annealed to 300° C. at a rate of 0.2° C./min.

EXAMPLE 4

Using LiOH.H$_2$O, Mn$_2$O$_3$ and Co$_3$O$_4$ as starting materials, they were blended so that the molar ratio of the respective compounds would be 1.00:0.85:0.10. To this blend, ethanol was added, followed by grinding well in a mortar to obtain a uniform mixture. The obtained mixture was pelletized by pressing and calcined in the atmospheric air at 500° C., 600° C., 700° C. and 800° C. for 6 hours each by stepwisely raising the temperature (5° C./min) It was then pulverized and mixed in an ethanol solvent and again pelletized by pressing, then fired in the atmospheric air at 800° C. for 48 hours and then annealed to 350° C. at a rate of 1° C./min. The obtained fired pellets were pulverized and mixed to obtain a powder of positive electrode active material.

EXAMPLE 5

Using Li$_2$CO$_3$, Mn$_2$O$_3$ and γ-Al$_2$O$_3$ as starting materials, they were blended so that the Li/(Mn+Al) molar ratio would be 1.04/2, and the Al/Mn molar ratio would be 0.12/1.88. To this blend, ethanol was added, followed by mixing in a ball mill to obtain a uniform mixture. The obtained mixture was calcined in the atmospheric air at 500° C., 600° C., 700° C. and 800° C. for 6 hours each by stepwisely raising the temperature (5° C./min) and further mixed in a dry system. Then, it was fired in the atmospheric air at 850° C. for 24 hours and then annealed to 300° C. at a rate of 0.2° C./min, to obtain a powder of positive electrode active material.

COMPARATIVE EXAMPLE 1

Using LiOH.H$_2$O and Mn$_2$O$_3$ as starting materials, they were blended so that the molar ratio of the respective compounds would be 1.00:1.00. To this blend, ethanol was added, followed by grinding well in a mortar to obtain a uniform mixture. The obtained mixture was pelletized by pressing and calcined in the atmospheric air at 500° C., 600° C., 700° C. and 800° C. for 6 hours each by stepwisely raising the temperature (5° C./min). The obtained product was pulverized and mixed in an ethanol solvent and again pelletized by pressing, then fired in the atmospheric air at 800° C. for 48 hours and then annealed to 350° C. at a rate of 1° C./min. The obtained fired pellets were pulverized and mixed to obtain a powder of positive electrode active material.

COMPARATIVE EXAMPLE 2

Using LiOH.H$_2$O and Mn$_2$O$_3$ as starting materials, they were blended so that the desired Li/Mn molar ratio would be 1.03:2.00. This blend was mixed in a ball mill to obtain a uniform mixture. The obtained mixture was calcined in the atmospheric air at 500° C. for 22 hours. This calcined powder was mixed and pulverized and then fired in the atmospheric air at 780° C. for 23 hours and then annealed to 450° C. at a rate of 0.2° C./min. It was maintained at 450° C. for 22 hours and then cooled to room temperature to obtain a powder of positive electrode active material.

COMPARATIVE EXAMPLE 3

Using LiOH.H$_2$O and Mn$_2$O$_3$ as starting materials, they were blended so that the molar ratio of the respective compounds would be 1.100:0.950. To this blend, ethanol was added, followed by grinding well in a mortar to obtain a uniform mixture. The obtained mixture was calcined in oxygen at 450° C., 500° C., 550° C., 600° C., 650° C., 700° C. and 750° C., for 3 hours each by stepwisely raising the temperature (5° C./min) and further mixed in a dry system. Then, it was fired in oxygen at 800° C. for 24 hours and then annealed to 300° C. at a rate of 0.2° C./min.

COMPARATIVE EXAMPLE 4

Using LiOH.H$_2$O, Mn$_2$O$_3$ and Co$_3$O$_4$ as starting materials, they were blended so that the molar ratio of the respective compounds would be 1.000:0.750:0.167. To this blend, ethanol was added, followed by grinding well in a mortar to obtain a uniform mixture. The obtained mixture was pelletized by pressing and calcined in the atmospheric air at 500° C., 600° C., 700° C. and 800° C. for 6 hours each by stepwisely raising the temperature (5° C./min). The product was pulverized and mixed in an ethanol solvent and again pelletized by pressing, then fired in the atmospheric air at 800° C. for 48 hours and then annealed to 350° C. at a rate of 1° C./min. The obtained calcined pellets were pulverized and mixed to obtain a powder of positive electrode active material.

Analysis and Evaluation

By power X-ray diffraction measurements, the obtained lithium manganese oxides were confirmed to have a cubic system phase of a space group Fd$\bar{3}$m (No. 227), and the lattice constants were also calculated by the following methods.

Namely, using the formula: $a_0 = d \cdot (h^2 + k^2 + l^2)^{1/2}$ wherein h, k and l are plane indices, and d is a spacing of (hkl), $a_0$ was calculated with respect to seven plane indices of (hkl)= (311), (222), (400), (331), (511), (440) and (531), and the average value thereof was taken as the lattice constant $a_0$.

Analysis of the Composition

The analytical values of the compositions were obtained by the following methods. The lithium manganese oxides used for the measurements, were subjected to vacuum drying treatment at 50° C. for 1 hour.

① Analysis of the Total Amount of Li

A lithium manganese oxide was accurately weighed and dissolved in a hydrochloric acid acidic solution under heating to obtain a solution to be measured. Using an atomic absorption photometer, the Li concentration was determined by a calibration method, and the Li content per unit weight was calculated.

② Analysis of the Total Amount of Mn+M (Co, Mg, Al): EDTA Chelate Titration

A lithium manganese oxide was accurately weighed and dissolved in a hydrochloric acid acidic solution under heating to obtain a solution to be measured. The solution was sampled by a whole pipette and put into a conical beaker, and a small excess of a 0.01M-EDTA solution was added thereto. Then, pure water was added to bring the total volume to 75 ml. Then, suitable amounts of a 8N-NaOH aqueous solution and an ammonia buffer solution were added to adjust the pH to 10. Pure water was added to adjust the total volume to 100 ml and then a ET indicator was dropwisely added. Using a 0.01M-Mg ion standard solution as a titration solution, titration was carried out by a microburet. The point at which the color of the BT indicator changed from blue to red, was taken as the end point. From the titration results, the content of (Mn+M(Co,Mg,Al)) per unit weight, was calculated.

③ Determination of the Molar Ratio of M(Co,Mg)/Mn: ICP Emission Spectral Analysis A lithium manganese oxide was accurately weighed and dissolved in a hydrochloric acid acidic solution under heating to obtain a solution to be measured. Using an ICP emission spectral analyzer, concentrations of Mn and M(Co, Mg) were determined by a calibration method, whereupon the molar ratio of M(Co,Mg)/Mn was calculated.

④ Determination of the Molar Ratio of Al/Mn: EDTA Chelate Titration

A lithium manganese oxide was accurately weighed and dissolved in a hydrochloric acid acidic solution under heating to obtain a solution to be measured. The solution was sampled by a whole pipette and put into a conical beaker, and a hydrochloric acid hydroxylamine aqueous solution and a triethanolamine aqueous solution were added thereto. Then, pure water was added to bring the total volume to 75 ml, and suitable amounts of concentrated aqueous ammonia and an ammonia buffer solution were added to adjust the pH to 10. Pure water was added to adjust the total volume to 100 ml, and then a BT indicator was added thereto. Using a 0.01M-EDTA standard solution as a titrating solution, titration was carried out by a microburet. The point at which the color of the BT indicator changed from red to blue, was taken as the end point. From the titration results, the content of Mn per unit weight was calculated. From this result and the result of the above ETDA chelate titration, the molar ratio of Al/Mn was determined.

⑤ Iodometry

A lithium manganese oxide was accurately weighed and put into a conical beaker. Then, a small excess amount of a KI saturated solution and concentrated hydrochloric acid were sequentially added in this order and completely dissolved, and then pure water was added to adjust the total volume to 100 ml. using a 0.1N-sodium thiosulfate solution as a titrating solution, titration was carried out by a microburet. Immediately before the end point, a predetermined amount of a starch solution was added, and the point at which the color of the solution changed from a purple color to colorless, was taken as the end point. From the titration result, equivalents of $Mn^{3+}$, $Mn^{4+}$ and $Co^{3+}$ per unit weight were determined.

⑥ Calculation of the Valency of Mn

The valency of Mn of a lithium manganese oxide was determined by the following calculation from the result of analyzing the total amount of Mn+M (Co, Mg, Al), the result of the molar ratio of M(Co, Mg, Al)/Mn and the result of analyzing equivalents of $Mn^{3+}$, $Mn^{4+}$ and ($Co^{3+}$) by the iodometry.

Co Substituted System

If it is assumed that $Mn^{3+}$, $Mn^{4+}$, $Mn^{2+}$ and $Co^{3+}$ are present in amounts of k, m, n and p mols, respectively, per 0.1 g of a sample, then in an iodometry, the following reactions will take place:

Reaction by $Mn^{4+}$:

$$kMn^{4+} + 4kI^- \rightarrow kMnI_2 + kI_2$$

$$kI_2 + 2kS_2O_3^{2-} \rightarrow KS_4O_6^{2-} + 2kI^-$$

Reaction by $Mn^{3+}$:

$$mMn^{3+} + 3mI^- \rightarrow mMnI_2 + (\tfrac{1}{2})mI_2$$

$$(\tfrac{1}{2})mI_2 + mS_2O_3^{2-} \rightarrow (\tfrac{1}{2})mS_4O_6^{2-} + mI^-$$

Reaction by $Mn^{2+}$:

$$nMn^{2+} + 2nI^- \rightarrow nMnI_2$$

$Mn^{2+}$ does not free $I_2$, whereby there will be no reaction with sodium thiosulfate.

Reaction by $Co^{3+}$:

$$pCo^{3+} + 3pI^- \rightarrow pMnI_2 + (\tfrac{1}{2})pI_2$$

$$(\tfrac{1}{2})pI_2 + pS_2O_3^{2-} \rightarrow (\tfrac{1}{2})pS_4O_6^{2-} + pI^-$$

From the foregoing, in the iodometry, a titration value corresponding to the (2k+m+p) mol will be obtained. On the other hand, in the EDTA chelate titration, a titration value corresponding to the (k+m+n+p) mol will be obtained.

Accordingly, (Mn,Co) mixed valency $$= 4 \times k(k+m+n+p) + 3 \times (m+p)/(k+m+n+p) + 2 \times n/(k+m+n+p)$$

$$= (4k+3m+3p+2n)/(k+m+n+p)$$

$$= 2 + (2k+m+p)/(k+m+n+p)$$

$$= 2 + \text{(iodometry result)}/\text{(EDTA chelate result)}$$

$$= V_{MC}$$

When the Mn valency is represented by a, and the Co valency is represented by $b_{Co}$, $$V_{MC} = a \times Mn/(Mn+Co) + b_{Co} \times Co/(Mn+Co).$$

Accordingly, a can be calculated by using $b_{Co}=3$ and the result of the molar ratio by ICP.

With respect to the valency of Co, it was constantly taken to be trivalency, based on Electrochemistry, 66,335 (1998) or J. Phys. Chem. Solids. vol. 57, No. 12, pp. 1851–1856, 1996, and 39th Electrical Cell Meeting, 2C16, 277 (1998).

Mg Substituted System

If it is assumed that $Mn^{3+}$, $Mn^{4+}$, $Mn^{2+}$ and $Mg^{2+}$ are present in amounts of k, m, n and q mols, respectively, per 0.1 g of a sample, then in an iodometry, the following reactions will take place.

Reaction by $Mn^{4+}$:

$$kMn^{4+} + 4kI^- \rightarrow kMnI_2 + kI_2$$

$$kI_2 + 2kS_2O_3^{2-} \rightarrow kS_4O_6^{2-} + 2kI^-$$

Reaction by $Mn^{3+}$:

$$mMn^{3+} + 3mI^- \rightarrow mMnI_2 + (\tfrac{1}{2})mI_2$$

$$(\tfrac{1}{2})mI_2 + mS_2O_3^{2-} \rightarrow (\tfrac{1}{2})mS_4O_6^{2-} + mI^-$$

Reaction by $Mn^{2+}$:

$$nMn^{2+} + 2nI^- \rightarrow nMnI_2$$

$Mn^{2+}$ does not free $I_2$, whereby there will be no reaction with sodium thiosulfate.

Reaction by $Mg^{2+}$:

$$qMg^{2+} + 2qI^- \rightarrow qMnI_2$$

$Mg^{2+}$ does not free $I_2$, whereby there will be no reaction with sodium thiosulfate.

From the foregoing, in the iodometry, a titration value corresponding to the (2k+m) mol will be obtained. On the other hand, in the EDTA chelate titration, a titration value corresponding to the (k+m+n+q) mol will be obtained. On the other hand, from the measurement of the ICP emission spectral analysis, the ratio of Mg/Mn will be determined.

Accordingly, Mn valency $$= 4 \times k/(k+m+n+q) + 3 \times m/(k+m+n+q) + 2 \times (n+q)/(k+m+n+q)$$

$$= (4k+3m+2n+2q)/(k+m+n+q)$$

$$= 2 + (2k+m)/(k+m+n+q)$$

$$= 2 + (2k+m)/(k+m+n+q) - q$$

$$= 2 + \text{(iodometry result)}/\text{(EDTA chelate result—ICP result)}$$

As described above, the Mn valency can be calculated from the result of the iodometry and the result of quantitative analysis of Mn.

Al Substituted System

From the result of analyzing the total amount of Mn by EDTA and the result of analyzing equivalents of $Mn^{3+}$ and $Mn^{4+}$ by iodometry, the valency of Mn of a lithium manganese oxide was determined by the following calculation.

If it is assumed that $Mn^{4+}$, $Mn^{3+}$ and $Mn^{2+}$ are present in amounts of k, m and n mols, respectively, per 0.1 g of a sample, then in the iodometry, the following reactions will take place.

Reaction by $Mn^{4+}$:

$$kMn^{4+} + 4kI^- \rightarrow kMnI_2 + kI_2 \quad (4)$$

$$kI_2 + 2kS_2O_3^{2-} \rightarrow kS_4O_6^{2-} + 2kI^- \quad (5)$$

Reaction by $Mn^{3+}$:

$$mMn^{3+} + 3mI^- \rightarrow mMnI_2 + (\tfrac{1}{2})mI_2 \quad (6)$$

$$(\tfrac{1}{2})mI_2 + mS_2O_3^{2-} \rightarrow (\tfrac{1}{2})mS_4O_6^{2-} + mI^- \quad (7)$$

Reaction by $Mn^{2+}$:

$$nMn^{4+} + 2nI^- \rightarrow nMnI_2 \quad (8)$$

$Mn^{2+}$ does not free $I_2$, whereby there will be no reaction with sodium thiosulfate. Further, $Al^{3+}$ undergoes the following reaction:

$$Al^{3+} + 3I^- \rightarrow AlI_3 \quad (9)$$

Thus, $Al^{3+}$ does not likewise free $I_2$, whereby there will be no reaction with sodium thiosulfate.

From the foregoing, in the iodometry, a titration value corresponding to the (2k+m) mol can be obtained. On the other hand, in the EDTA chelate titration, titration value corresponding to the (k+m+n) mol will be obtained.

Accordingly, Mn valency $$= 4 \times k(k+m+n) + 3 \times m/(k+m+n) + 2 \times n/(k+m+n)$$

$$= (4k+3m+2n)/(k+m+n)$$

$$= 2 + (2k+m)/(k+m+n)$$

$$= 2 + \text{(iodometry result)}/\text{(EDTA chelate result)} \quad (10)$$

As shown by the formula (10), the valency of Mn can be calculated from the result of the iodometry and the result of quantitative analysis of Mn.

(7) Determination of the Amount of Oxygen

The compositional ratio of Li, Mn and M (Co, Mg, Al) was calculated from the result of analyzing the total amount of Li by atomic absorption and the result of quantitative determination of Mn and M (Co, Mg, Al) obtained by ICP. Further, the composition of the lithium manganate product shown in Examples is crystallographically represented by $Li(Mn_{2-x-y}Li_xM_y)O_{4-\delta}$, and the compositional ratio of cations was determined so that the sum would be 3. From the molar ratio of Li, Mn and M (Co, Mg, Al) and the Mn valency obtained by the above-mentioned method, the amount of oxygen was calculated based on the rule of electrical neutrality.

Preparation of a λ-form Sample

To evaluate the thermal characteristics of a lithium manganese oxide in a charged state, a sample in each Example or Comparative Example was subjected to acid treatment in a sulfuric acid acidic aqueous solution under a condition of pH1 to withdraw lithium, and after suction filtration and water-washing step, it was dried overnight at room temperature, then pulverized and again dried at 90° C. for 1 hour to obtain a λ-form sample.

From the powder X-ray diffraction measurement, the sample having Li withdrawn was confirmed to maintain a single phase of the cubic system spinel, and from the result of the lattice constant calculated by the above-mentioned method, it was confirmed to be a λ-form structure having Li withdrawn which corresponds to the charged state.

Thermal Stability Test

With respect to each λ-form sample in each Example or Comparative Example, differential scanning calorimetrical measurement (DSC measurement, in nitrogen atmosphere, temperature-raising rate: 10° C./min) was carried out to examine the exothermic behavior accompanying the phase transfer.

Further, with respect to each λ-form sample in each Example or Comparative Example, thermogravimetry (TG measurement, in the atmosphere of air, temperature raising rate: 5° C./min) was carried out to examine the thermogravimetrical stability from room temperature to 200° C.

Preparation of a Cell and Evaluation

Figure 1:
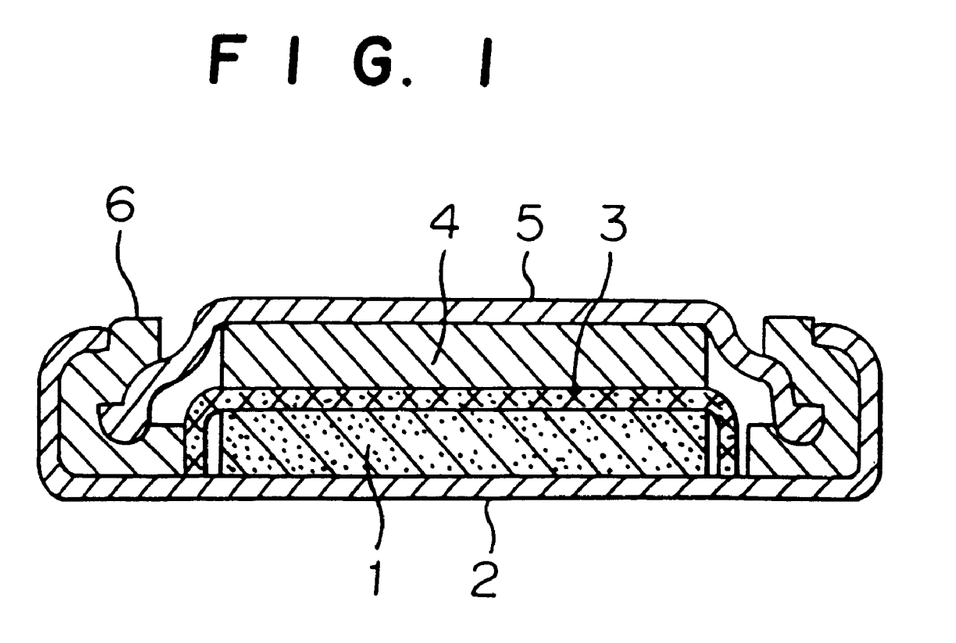
FIG. 1 is a vertical cross-sectional view of a coin-shaped cell employed in a test for production of an active material for a non-aqueous electrolyte secondary cell in Examples of the present invention.

A positive electrode active material prepared in each Example or Comparative Example, acetylene black as an electroconductive agent and a polytetrafluoroethylene resin as a binder, were mixed in a weight ratio of 75:20:5 to obtain a positive electrode mixture. Then, 0.1 g of the positive electrode mixture was molded into a sheet to obtain a positive electrode. Referring to FIG. 1, a porous polypropylene film as a separator 3 was placed on the positive electrode 1. A lithium plate as a negative electrode 4 was press-bonded to a sealing cover 5 provided with a gasket 6 made of polypropylene. Using a solution comprising ethylene carbonate having 1 mol/l of lithium perchlorate dissolved and 1,2-dimethoxyethane (50 vol %: 50 vol %) as a non-aqueous electrolyte, this solution was added on a separator 3 and the negative electrode 4. Then, the casing 2 was sealed with the sealing cover 5.

With respect to the obtained cell, evaluation of the charge-discharge cycle characteristics was carried out at room temperature. The charge-discharge cycle test in the Working Examples of the present invention was carried out by conducting constant current charging and discharging at a charge-discharge current of 2 mA within a voltage range of from 4.35 V to 3.2 V. The compositions, the thermal stability and the initial discharge capacities and cycle characteristics at room temperature, of the respective samples in the above Examples and Comparative Examples, are shown in Tables 1 and 2.

From Tables 1 and 2, it is evident that with the lithium manganese oxides according to the first aspect of the present invention, the three properties i.e. the high capacity, the high cycle characteristics and the high thermal stability, are improved in good balance.

In the Examples of the present invention, metal lithium was employed as the negative electrode material for cells, but similar results were obtained also in a case where a lithium alloy or a compound capable of receiving and discharging lithium, was employed.

TABLE 1

| | Amount substituted at Mn sites | | | | Amount of oxygen | Valency of Mn | Thermal stability (λ-form) | | Room temperature cycle test | |
|---|---|---|---|---|---|---|---|---|---|---|
| | | | | | | | DSM exothermic peak temperature (° C.) | TG (per 1 g of sample) (mg) | Initial discharge capacity (mAh/g) | Capacity-maintaining ratio (%) (after 100 cycles) |
| | Li x | Co y | Mg y | Al y | | | | | | |
| Example 1 | 0.012 | 0.116 | — | — | 3.988 | 3.534 | 353.8 | −0.384 | 111.9 | 92.9 |
| Example 2 | 0.046 | 0.116 | — | — | 3.995 | 3.589 | 348.9 | −0.930 | 110.9 | 99.0 |
| Example 3 | 0.049 | — | 0.041 | — | 3.996 | 3.592 | 324.0 | −0.823 | 115.2 | 97.8 |
| Example 4 | 0.019 | 0.296 | — | — | 3.978 | 3.590 | 392.6 | −2.359 | 88.9 | 99.6 |
| Example 5 | 0.067 | — | — | 0.123 | 4.002 | 3.629 | 343.4 | −0.603 | 113 | 98.2 |
| Comparative Example 1 | 0.017 | — | — | — | 3.990 | 3.510 | 294.7 | −3.292 | 124.6 | 88 |
| Comparative Example 2 | 0.042 | — | — | — | 3.984 | 3.537 | 281.3 | −3.890 | 123 | 97.0 |
| Comparative Example 3 | 0.115 | — | — | — | 3.983 | 3.634 | 271.9 | −10.515 | 94.4 | 99.0 |
| Comparative Example 4 | 0.022 | 0.486 | — | — | 3.961 | 3.647 | No peak | −1.756 | 59.6 | 1oo |

In Table 1, x and y correspond to x and y in the formula $Li(Li_xM_yMn_{2-x-y})O_{4-\delta}$, respectively, and they represent the amounts substituted at Mn sites. The amount of oxygen corresponds to 4−δ in the above formula. Further, the initial discharge capacity is a value per g of the positive electrode active material.

TABLE 2

| | Lattice constant (Å) | |
| --- | --- | --- |
| | Before acid treatment | After acid treatment λ |
| Example 1 | 8.2213 | 8.0382 |
| Example 2 | 8.2110 | 8.0547 |
| Example 3 | 8.2280 | 8.0659 |
| Example 4 | 8.1814 | 8.0485 |
| Example 5 | 8.2113 | 8.0724 |
| Comparative Example 1 | 8.2301 | 8.0382 |
| Comparative Example 2 | 8.2194 | 8.0496 |
| Comparative Example 3 | 8.1951 | 8.0665 |
| Comparative Example 4 | 8.1308 | 8.0513 |

EXAMPLE 6

Using $Mn_2O_3$, $LiOH.H_2O$ and $Al_2O_3$ as starting materials, they were blended so that the molar ratio of the respective compounds would be 0.895:1.010:0.100. To this blend, ethanol was added, followed by grinding well in a mortar to obtain a uniform mixture. The obtained mixture was calcined in the atmospheric air at 500° C. for 24 hours. Then, it was fired in the atmospheric air at 800° C. for 24 hours and then annealed to 450° C. at a rate of 0.2° C./min. The product was again heated in a nitrogen atmosphere at 550° C. for 24 hours, and then the sample was withdrawn from the furnace and rapidly cooled (the temperature-lowering rate: 50° C./min).

The compositional analysis of the obtained lithium manganese oxide was carried out in the same manner as in Example 5, whereby the composition was found to be $Li(Mn_{1.788}Li_{0.011}Al_{0.201})O_{3.955}$ (average valency of Mn: 3.521). Further, a cell was prepared and evaluated in the same manner as in Example 5, whereby the initial capacity was 121 mAh/g, and the capacity-maintaining ratio after 100 cycles of charging and discharging, was 97.2%.

EXAMPLE 7

Using $Mn_2O_3$, $LiOH.H_2O$ and $Al_2O_3$ as starting materials, they were blended so that the molar ratio of the respective compounds would be 0.942:1.016:0.050. To this blend, ethanol was added, followed by grinding well in a mortar to obtain a uniform mixture. The obtained mixture was calcined in the atmospheric air at 500° C. for 24 hours. Then, it was fired in the atmospheric air at 800° C. for 24 hours, and then annealed to 450° C. at a rate of 0.2° C./min. The product was again heated in a nitrogen atmosphere at 450° C. for 24 hours, and then the sample was withdrawn from the furnace and rapidly cooled.

The compositional analysis of the obtained lithium manganese oxide was carried out in the same manner as in Example 5, whereby the composition was found to be $Li(Mn_{1.884}Li_{0.014}Al_{0.102})O_{3.969}$ (average valency of Mn: 3.513). Further, a cell was prepared and evaluated in the same manner as in Example 5, whereby the initial capacity was 124.3 mAh/g, and the capacity-maintaining ratio after 100 cycles of charging and discharging was 96.9%.

2. Examples Relating to the Second Aspect of the Present Invention

EXAMPLE 8

Using $LiOH.H_2O$, $Mn_2O_3$, $Co_3O_4$ and $TiO_2$ as starting materials, they were blended so that the molar ratio of the respective compounds would be 3.030:2.685:0.140:0.180. To this blend, ethanol was added, followed by grinding well in a mortar to obtain a uniform mixture. The obtained mixture was calcined in the atmospheric air at 500° C. for 24 hours. This calcined powder was mixed in a dry system and then fired in the atmospheric air at 800° C. for 24 hours. Then, it was annealed to 450° C. at a rate of 1° C./min, then maintained at 450° C. for 6 hours and then cooled to room temperature at a rate of 5° C./min to obtain a powder of positive electrode active material.

COMPARATIVE EXAMPLE 5

Using $LiOH.H_2O$, $Mn_2O_3$ and $Co_3O_4$ as starting materials, they were blended so that the molar ratio of the respective compounds would be 3.030:2.685:0.200. To this blend, ethanol was added, followed by grinding well in a mortar to obtain a uniform mixture. The obtained mixture was calcined in the atmospheric air at 500° C. for 24 hours. This calcined powder was mixed in a dry system and then fired in the atmospheric air at 800° C. for 48 hours. Then, it was annealed to 450° C. at a rate of 1° C./min, then maintained at 450° C. for 6 hours and then cooled to room temperature at a rate of 5° C./min to obtain a powder of positive electrode active material.

COMPARATIVE EXAMPLE 6

Using $LiOH.H_2O$ and $Mn_2O_3$ as starting materials, they were blended so that the desired Li/Mn molar ratio would be 1.03/2.00. This blend was mixed in a ball mill to obtain a uniform mixture. The obtained mixture was calcined in the atmospheric air at 500° C. for 22 hours. This calcined powder was mixed and pulverized, and then fired in the atmospheric air at 780° C. for 23 hours. Then, it was annealed to 450° C. at a rate of 0.2° C./min, then maintained at 450° C. for 22 hours and then cooled to room temperature to obtain a powder of positive electrode active material.

COMPARATIVE EXAMPLE 7

Using $LiOH.H_2O$, $Mn_2O_3$ and $TiO_2$ as starting materials, they were blended so that the molar ratio of the respective compounds would be 3.030:2.835:0.300. To this blend, ethanol was added, followed by grinding well in a mortar to obtain a uniform mixture. The obtained mixture was calcined in the atmospheric air at 500° C. for 24 hours. This calcined powder was mixed in a dry system, and then fired in the atmospheric air at 800° C. for 24 hours. Then, it was annealed to 450° C. at a rate of 1° C./min, then maintained at 450° C. for 6 hours and then cooled to room temperature at a rate of 5° C./min to obtain a powder of positive electrode active material.

Analysis and Evaluation

By the powder X-ray diffraction measurements, all of the above samples were confirmed to have a cubic spinel phase. Further, the lattice constants were also calculated by the following methods.

Namely, using the formula:

$$A_0 = d \cdot (h^2 + k^2 + l^2)^{1/2}$$

wherein h, k and l are plane indices, and d is the spacing of (hkl), seven plane indices i.e. (hkl)=(311), (222), (400), (331), (511), (440) and (531), were calculated, and the average value thereof was taken as the lattice constant $a_0$.

Compositional Analysis

The compositional ratios of Li, Mn and substituted elements M and N, of the positive electrode active material powders corresponding to Example 1 and Comparative Example 3, were obtained by the ICP emission spectral analyses, the valency of Mn was determined from the results of the iodometry and the ICP emission spectral analyses, and the amount of oxygen was determined on the principle of electrical neutrality. With respect to the sample corresponding to Comparative Example 1, the amount of Li was obtained by the atomic absorption analysis, the amount of Mn+Co was obtained by the EDTA chelate titration, the ratio of Mn/Co was obtained by the ICP emission spectral analysis, and the valency of Mn was obtained from the results of the iodometry, the ICP emission spectral analysis, and the chelate titration, and the amount of oxygen was determined on the principle of electrical neutrality. With respect to the sample corresponding to Comparative Example 2, the amount of Li was obtained by the atomic absorption analysis, the amount of Mn was obtained by the EDTA chelate titration, the valency of Mn was determined from the results of the iodometry and the EDTA chelate titration, and the amount of oxygen was determined on the principle of electrical neutrality. Further, when the molar ratio of Li/(Mn+M+N) is ½, the composition of the product will be $Li(Mn_{2-x-y-z}M_{x1}Li_{x2}N_y)O_4$ having a crystallographically excess amount of Li substituted at Mn sites, and such a compositional ratio was determined so that the sum would be 3.

Preparation of a λ-form Sample

In order to evaluate the thermal characteristics of a lithium manganese oxide in a charged state, the above sample was subjected to acid treatment in a sulfuric acid acidic aqueous solution under a condition of pH1 to withdraw Li, followed by suction filtration and washing with water, and then the sample was dried overnight at room temperature, further pulverized and then dried at 90° C. for 1 hour to obtain a λ-form sample.

From the powder X-ray diffraction measurement, the sample having Li withdrawn by the above acid treatment, was confirmed to maintain a single phase of a cubic spinel and to have a λ-structure having Li withdrawn which corresponds to a charged state from the result of the lattice constant calculated by the above method.

Thermal Stability Test

With respect to each λ-form sample obtained as described above, the differential scanning calorimetrical measurement (DSC measurement, in a nitrogen atmosphere, temperature raising rate from 10° C./min) was carried out to examine the exothermic behavior accompanying the phase transfer.

Further, with respect to each λ-form sample, the thermogravimetric measurement (TG measurement, in an atmosphere of air, temperature raising rate: 5° C./min) was carried out to examine the thermogravimetric stability from room temperature to 200° C.

Preparation and Evaluation of a Cell

A positive electrode active material prepared, acetylene black as an electroconductive agent and a polytetrafluoroethylene resin as a binder, were mixed in a weight ratio of 75:20:5 to obtain a positive electrode mixture. Further, the positive electrode mixture was molded into a sheet to obtain a positive electrode. Referring to FIG. 1, a porous propylene film as a separator 3, was placed on the positive electrode 1. A lithium plate as a negative electrode 4, was press-bonded to a sealing cover 5 provided with a gasket 6 made of polypropylene. Using a solution comprising ethylene carbonate, dimethyl carbonate and diethyl carbonate (40 vol %: 40 vol %: 20 vol %) having 1 mol/l of $LiPF_6$ dissolved, as an electrolyte, this electrode was added on the separator 3 and the negative electrode 4. Then, the casing 2 was sealed with the cover 5.

The high temperature cycle characteristics at 50° C. of the obtained cell were measured. The charge-discharge cycle test in this Example was carried out by constant current charging and discharging at a charge-discharge current density of 1 $mA/cm^2$ and a voltage range of from 4.35 V to 3.2 V.

With respect to the respective samples in the Examples and Comparative Examples, the compositions, the thermal stability, the initial discharge capacities at a high temperature and the results the cycle characteristic tests, are shown in Tables 3 and 4.

TABLE 3

| | Amount substituted at Mn sites | | | | Amount of oxygen | Valency of Mn | Thermal stability (λ-form) | | High temperature cycle test (50° C.) | |
|---|---|---|---|---|---|---|---|---|---|---|
| | | | | | | | DSM exothermic peak temperature (° C.) | TG (per 1 g of sample) (mg) | Initial discharge capacity (mAh/g) | Capacity-maintaining ratio (%) (after 100 cycles) |
| | M1 (Co) $x_1$ | M2 (Li) $x_2$ | N (Ti) y | Total ($x_1 + x_2 + y$) | | | | | | |
| Example 8 | 0.140 | 0.038 | 0.061 | 0.239 | 4.068 | 3.654 | 385.1 | −0.274 | 108.4 | 89.7 |
| Comparative Example 5 | 0.196 | 0.019 | — | 0.215 | 3.976 | 3.554 | 363.2 | −2.416 | 105.9 | 87.3 |
| Comparative Example 6 | — | 0.045 | — | 0.045 | 4.007 | 3.565 | 282.3 | −1.976 | 124.7 | 66.0 |
| Comparative Example 7 | — | 0.053 | 0.096 | 0.149 | 4.049 | 3.599 | 325.7 | −2.413 | 114.1 | 76.3 |

In Table 1, $x_1$ and $y_2$ correspond to $x_1$ and $y_2$ in the formula $Li(Co_{x1}Li_{x2}Ti_yMn_{2-x1-x2-y})O_{4-\delta}$, respectively, and they represent the amounts substituted at Mn sites. The amount of oxygen corresponds to 4−δ in the above formula.

Further, the initial discharge capacity is a value per g of the positive electrode active material.

TABLE 4

| | Lattice constant (Å) | |
|---|---|---|
| | Before acid treatment | After acid treatment λ |
| Example 1 | 8.2217 | 8.0580 |
| Comparative Example 1 | 8.1969 | 8.0452 |
| Comparative Example 2 | 8.2303 | 8.0476 |
| Comparative Example 3 | 8.2510 | 8.0578 |

From Tables 3 and 4, it is evident that with the lithium manganese oxides according to the second aspect of the present invention, the three properties i.e. the high capacity, the high cycle characteristics and the high temperature stability, are improved in a good balance at a high level. For example, the sample of Comparative Example 5 is within the scope of the first aspect of the present invention, but the sample of Example 8 has characteristics superior thereto.

In the above Examples, metal lithium was used as the negative electrode material for the cells, but similar results were obtained also in a case where a lithium alloy or a compound capable of receiving and discharging lithium, was used.

According to the present invention, it is possible to obtain a lithium secondary cell having the three properties i.e. the charge-discharge capacity, the cycle characteristics and the high temperature stability, improved in good balance. As a result, it is possible to use an inexpensive lithium manganese oxide as a positive electrode material and to provide a safe, inexpensive high performance lithium secondary cell for a wide range of applications. Thus, the industrial value of the present invention is substantial.

What is claimed is:

1. A positive electrode material for a lithium secondary cell, which contains a spinel-type lithium manganese oxide having a crystal structure belonging to Fd3̄m (No.227), wherein the lithium manganese oxide satisfies the following formula:

$$Li(Mn_{2-x-y}Li_xM_y)O_{4-\delta}A_z$$

wherein M is at least one metal element substitutable at Mn (16d) sites, other than Mn and Li, A is a halogen atom, x is from 0.01 to 0.10, y is a positive number, z is from 0 to 0.2, and ẟ represents a quantity of oxygen deficiency, and the average valency a of Mn is from 3.501 to 3.635.

2. The positive electrode material for a lithium secondary cell according to claim 1, wherein the metal element M is at least one member selected from the group consisting of Cr, Co, Fe, Ni, Cu, Zn, Ga, Al, B and Mg.

3. The positive electrode material for a lithium secondary cell according to claim 1, wherein x is from 0.015 to 0.08.

4. The positive electrode material for a lithium secondary cell according to claim 1, wherein δ is from −0.025 to 0.05.

5. The positive electrode material for a lithium secondary cell according to claim 1, wherein δ is from 0.001 to 0.05.

6. The positive electrode material for a lithium secondary cell according to claim 1, wherein y is from 0.01 to 0.5.

7. The positive electrode material for a lithium secondary cell according to claim 1, wherein y is from 0.05 to 0.4.

8. The positive electrode material for a lithium secondary cell according to claim 1, wherein z is substantially 0.

9. A positive electrode material for a lithium secondary cell, which contains a spinel-type lithium manganese oxide having a crystal structure belonging to space group Fd3̄m (No.227), wherein the lithium manganese oxide is such that some of 16d sites which are normally occupied by manganese atoms, are substituted by element M substitutable in a valency of at most 3 and element N substitutable in a valency of at least 4, and the average valency of manganese is at least 3.501.

10. The positive electrode material for a lithium secondary cell according to claim 9, wherein the average valency of Mn is at most 3.800.

11. The positive electrode material for a lithium secondary cell according to claim 9, wherein the total substitution ratio by elements M and N is from 5 to 25 atomic % based on Mn atoms.

12. The positive electrode material for a lithium secondary cell according to claim 9, wherein element M is at least one member selected from the group consisting of Co, Fe, Cr, Ga, Al, Cu, Ni, Mg, Zn, B and Li.

13. The positive electrode material for a lithium secondary cell according to claim 9, wherein element N is at least one member selected from the group consisting of Ti, Sn, Ge, V, Nb, Ta and Sb.

14. A lithium secondary cell having a positive electrode made of the positive electrode material as defined in claim 1.

15. The lithium secondary cell according to claim 14, wherein a non-aqueous electrolyte containing a lithium salt is used as its electrolyte.

16. A lithium secondary cell having a positive electrode made of the positive electrode material as defined in claim 9.

17. The lithium secondary cell according to claim 16, wherein a non-aqueous electrolyte containing a lithium salt is used as its electrolyte.

* * * * *